June 12, 1962
H. S. McCONKIE
3,038,517
TUBELESS TIRE WITH INNER TUBE AT LEAST PARTIALLY FLOATING THEREIN
Filed Feb. 26, 1958
3 Sheets-Sheet 1
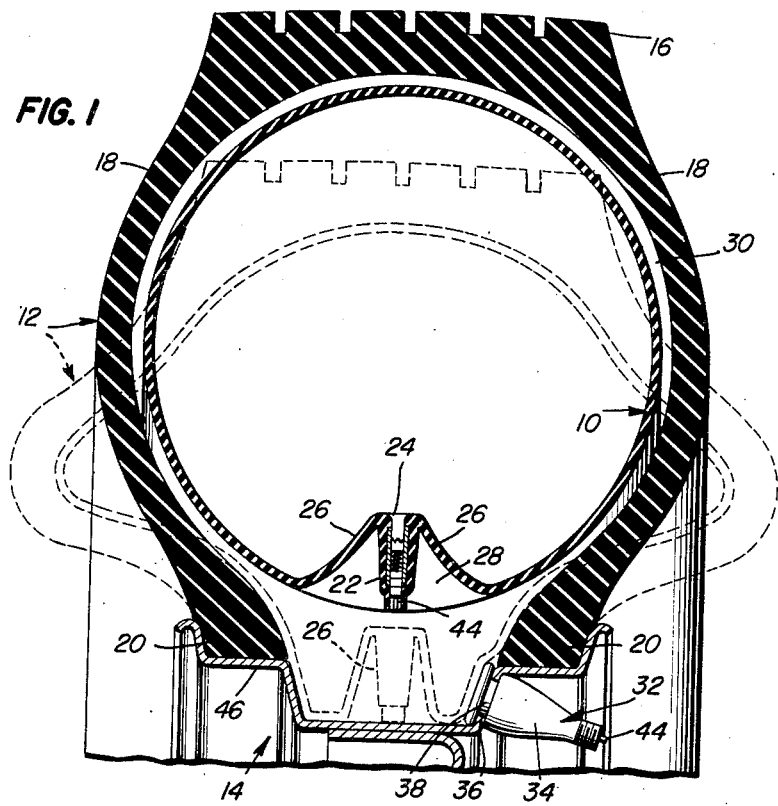
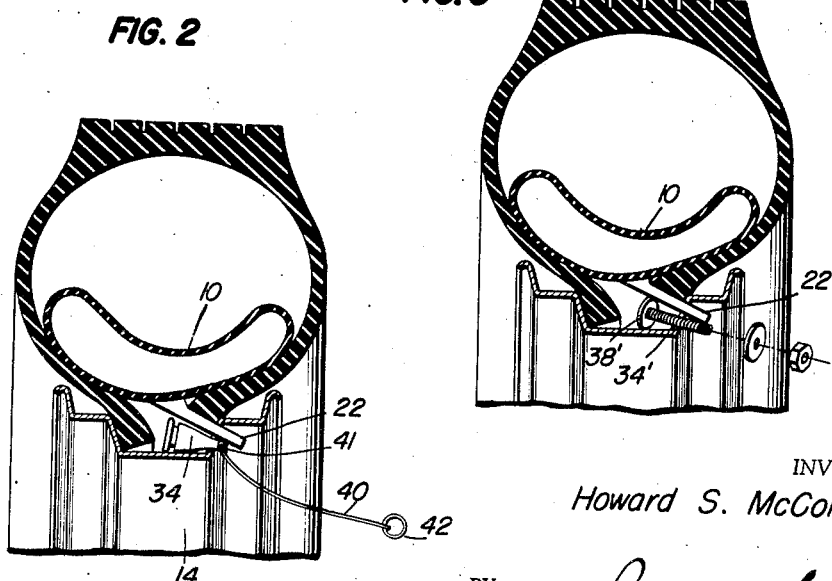
INVENTOR
Howard S. McConkie
BY
ATTORNEY June 12, 1962

H. S. McCONKIE 3,038,517

TUBELESS TIRE WITH INNER TUBE AT LEAST PARTIALLY FLOATING THEREIN

Filed Feb. 26, 1958

INVENTOR
Howard S. McConkie

BY *Imirie & Smiley*

ATTORNEY

June 12, 1962

H. S. McCONKIE 3,038,517

TUBELESS TIRE WITH INNER TUBE AT LEAST
PARTIALLY FLOATING THEREIN

Filed Feb. 26, 1958

INVENTOR
Howard S. McConkie

BY *Imirie & Smiley*

ATTORNEY

United States Patent Office 3,038,517
Patented June 12, 1962

3,038,517
TUBELESS TIRE WITH INNER TUBE AT LEAST PARTIALLY FLOATING THEREIN
Howard S. McConkie, Fort Bragg, N. C.
(101 Etter St., Hot Springs, Ark.)
Filed Feb. 26, 1958, Ser. No. 717,625
10 Claims. (Cl. 152—349)

This invention relates to tubeless type tires and more particularly to a tubeless tire provided with a floating or semi-floating inner tube for blowout protection.

While tubeless tires have gained general commercial acceptance, they are subject to a number of disadvantages including vulnerability to blowout or sudden collapse with consequent danger to the occupants of the automobile; and difficulty in, and need for, special tools to install the tires on the vehicle wheel rims so as to bulge the tire beads into sealing engagement with the rim to permit inflation.

It is a primary object of this invention to obviate these disadvantages by provision of an inner tube entirely, or nearly entirely, floated within the tire to provide safety against sudden puncture of the tire, and to enable installation of the tire to the rim without need for special tools.

It is a further object of the invention to provide a double air compartment within a tubeless type tire, one compartment completely surrounding the other, except at possible points of attachment.

Another object of the invention is to provide an audible signal of puncture or leakage of the tire.

Yet another object is to provide an inner tube which can be installed completely within a conventional tubeless tire on a conventional wheel rim of any type including drop center.

Still another object is to provide a safety member for tubeless tires for security in event of blowout without sacrificing the comfort of or other qualities of the ride and performance of the tire.

A further object is to provide a safety member for conventional tubeless tires which can be securely affixed within the tire and which will retain its balance and stability during running of the tire without objectionable shifting or vibration due to rotational and centrifugal forces, air currents and tire friction.

A still further object is to provide an inner tube for tubeless tires which is easy to mount and inflate and which enables the tubeless tire itself to be more easily mounted and inflated.

Yet another object is to provide an inner tube, for a conventional tubeless type tire, of simple construction and relatively inexpensive to manufacture.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a transverse radial section of a tubeless tire mounted on a drop-center rim assembled with an inner tube according to the invention, and showing in dotted lines the relative positions of the parts after puncture of the tire;

FIG. 2 is a reduced sectional view similar to that of FIG. 1, and showing the parts in an intermediate state of assembly;

FIG. 3 is a sectional view similar to FIG. 2, but showing a modified rim valve;

Figure 4:
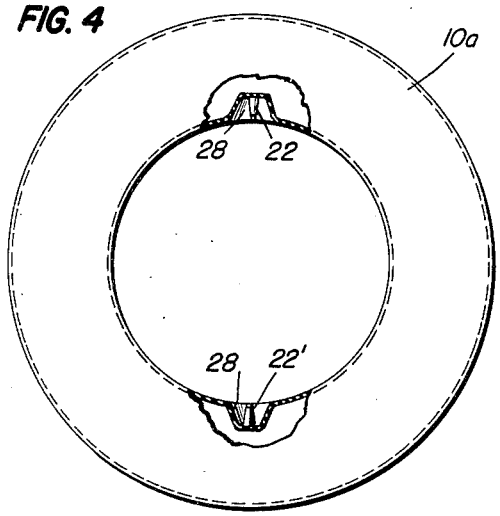
FIG. 4 is a view in elevation of a modified, balanced tube, parts being in section to show the balancing arrangement.

Referring now to the drawings, the invention is shown in FIG. 1 as embodied in an inner tube 10 which is floated at least partially freely entirely within a conventional tubeless tire 12 mounted on a drop-center wheel rim 14. The details of construction of the tire are well known to those skilled in the art and need not be described here. It is sufficient to say that the tire has the usual tread 16, sidewalls 18 and rim engaging beads 20.

The inner tube 10, which may also be of conventional construction as used with tubed tires, is slightly modified in the drawing, and comprises a thin walled endless rubber tube, doughnut shaped when inflated, having a metal valve stem 22 vulcanized in an opening 24 in the inner periphery of the tube. Preferably, for reasons to be later explained, the tube during its manufacture is prestressed in the areas 26 surrounding the opening 24 so that when deflated or inflated, a pocket or recess 28 is formed within which the valve stem 22 is seated so as not to substantially protrude beyond the circumscribing circle formed by the inner periphery of the tube. The inflated tube 10 and valve floats entirely within the tire 12 and is compressed and separated from the inner surface of the tire by a ringlike layer of air designated 30. Tube valve core 44 should not extend outside stem 22.

The tire 12 and optionally tube 10, as will be later explained, is inflated by means of an inflation valve 32 including a stem body 34 which protrudes through a hole 36 in the wall of the drop-center rim 14. The valve 32, preferably, is the usual type of rubber bodied valve employed with tubeless type tires and the rim hole 36 is air sealed by means of a snug fit of the rim portion surrounding the hole 36 within an annular recess 38 surrounding the stem. The valve stem 34 and removable valve core with protruding nipple designated 44, may be of conventional construction generally in use with tubeless tires. However, it may be desirable to make the stem of slightly larger internal diameter, or the tube stem 22 smaller, so that the tube stem 22 may be easily inserted therein from the inside of the rim, when the valve core 44 is removed, in order to inflate the tube 10.

To install the tire 12 and tube 10, the operator will first remove the stem 34, or if the stem is oversize he will remove the core 44 from valve stem 34. He will next insert one beaded edge 20 of tire 12 into the drop center channel of the rim. The deflated tube 10 is then inserted in the tire 12 and the tube valve stem 22 twisted and inserted into the rim opening 36 or the valve stem 34. Later discussion will show how to install the rim valve stem 34 after the second bead of the tire has been mounted, when such rim valve stem channel is not large enough to permit the insertion of the tube valve stem. The other beaded edge 20 of the tire 12 is next mounted or inserted into the drop-center channel of the rim. Inflating air is then fed to the tube 10 through the valve stem 22 seated in the opening 36 or stem 34. Preferably, about half the operating pressure of the tire is used in the tube, or about 10–15 lbs./square inch for pleasure vehicles. This pressure will extend tube 10 to fill the entire space within the tire and bulge the tire walls 18 and beads 20 outwardly so that both beaded edges 20 press against the rim seats 46 in air sealing engagement, or sufficiently so that when higher pressure is placed in the tubeless type tire, as later described, the beads will move into the usual complete air sealing engagement with the rim.

The tube valve stem 22 is then pushed inside the tire. Next, the stem 34, as later described, is installed or the valve core 44 is inserted in the installed stem 34. Air is then fed through valve 32 into the tire 12 until an operating pressure from 20–30 lbs./square inch is reached. This will compress tube 10 and surround it with a cushioning rim of air in space 30. It is apparent that the installaiton process described is simple and easy to perform and needs no special tools, avoiding the requirement for external peripheral compressing devices normally used to install tubeless tires which expand the beaded edges against the rim seats 46.

If the stem 34 is of the usual type and of normal size so that the tube valve 22 cannot be inserted therethrough, it may be provided, as shown in FIG. 2, with a removably attached leader 40, conveniently secured to the stem 34 by a cap 41 and preferably provided with a handle 42 such as a ring or the like. As shown, during the mounting of the tire, the stem 34 may be laid in the drop center of the rim 14 with the leader 40 threaded through the rim hole 36. After the tube 10 is inflated and its stem 22 pushed in through the hole 36, the leader 40 may then be pulled to draw the stem 34 out through the hole 36 so that it can then be seated in the usual manner and air pressure injected into the tire.

Another suitable type of rim valve element is shown in FIG. 3 as comprising a tubular stem 34', of metal or other suitable material, that is externally threaded along at least part of its length and is provided at its inner end with a flange 38' preferably formed of deformable material, such as aluminum, lead, semistiff plastic or the like, which is capable of sealing engagement with the surface of the rim surrounding the hole. As the stem 34' is relatively small in diameter, in comparison to the usual rubber bodied valve, it may be initially positioned partially extending through the hole 36 jointly with the tube stem 22, as shown, and then, after the tube is inflated and its stem 22 pushed into the rim, the stem 34' may be pulled out to seat the flange 38' against the inner surface of the rim to which it will conform and make air tight engagement therewith when drawn tightly by a washer and nut threaded on the stem 34'. Obviously, the stem 34' may be provided with a leader 40 or the like, if desired.

Figure 5:
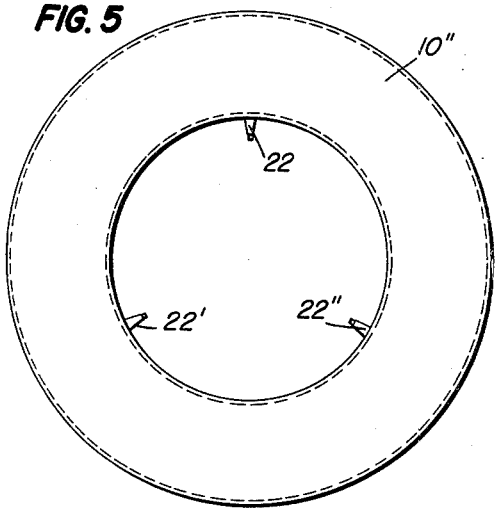
FIG. 5 is a view in elevation of another modification of a balanced tube.

In use of the tire with greater pressure therein than originally placed in the tube 10, the tire will carry the load and the tube, as a safety device, will float freely therein with some relative rotational movement at high speeds. Any resulting vibration and unbalance may be reasonably avoided by applying balancing centrifugal weights to the tube, not shown. Conveniently, a balancing weight may be obtained by providing a duplicate recessed inner tube valve spaced from the valve 22 around the tube 180°, and this second valve would also facilitate operation on the tube. Such a structure is shown in FIG. 4 wherein the tube 10a is provided with two diametrically disposed valve stems 22, 22' within pockets 28, 28'. Ideally, however, the tube is provided with at least three stems or the like, as shown in FIG. 5, wherein the tube 10" is provided with at least three stems or similar projections 22, 22' and 22" which may be recessed or not, as desired. While two stems balance the tube, three stems or projections not only provide better balance but also center the tube axially when the stems engage the rim, whether continuously, if the stems project, or only when the tire is evacuated, if the stems are recessed.

When the tire 12 suffers a leak, crack, puncture or blowout, the air will be released from space 30; tube 10 will expand to fill the tire, and the tire and tube will take the load positions shown in dotted lines in FIG. 1. The tube 10 will safely carry the weight of the vehicle for an indefinite period, but the soft appearance of the tire will indicate need for repair. As the valve core 44 is recessed in the stem 22, engagement of the rim with the stem does not release air from the tube.

Before the loss of air pressure in the tubeless type tire assembly, such as by puncture of the tire, the tube valve stem 22 rides in pocket 28, formed in manufacture of the tube, to prevent the metal stem from striking, scarring or otherwise injuring the inner surface of the tire. During the escape of air from the tire, tube 10 expands, valve stem 22 gradually lowers and ultimately strikes the rim 14 between the tire beads, as shown in dotted lines. As the wheel continues to rotate, the valve stem 22 will periodically strike or scratch against the rim emitting an audible signal to warn the driver of the puncture. When the tube fully expands, this signalling will largely cease, except as the free floating tube creeps within the tire.

To repair the tire after a puncture, which requires removal of the tire from the rim, valve core 44 is removed, and a hooklike instrument, not shown, may be inserted through stem 34 to seek the tube valve stem 22 and tube valve core 44 to deflate the tube or to pull stem 22 into stem 34. If the tube is fully free floating, however, it is probable that the tube stem 22 is displaced from the stem 34 and in this event, it will be necessary to insert a sharp instrument to puncture the tube. When the air in tube 10 is released and the deflated tube and tire removed from the rim, both the tire and the tube may be repaired.

Figure 6:
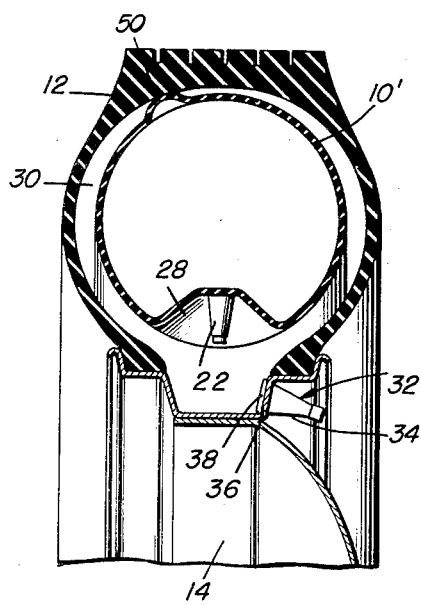
FIG. 6 is a reduced sectional view similar to FIG. 1, but showing a modification.
Figure 7:
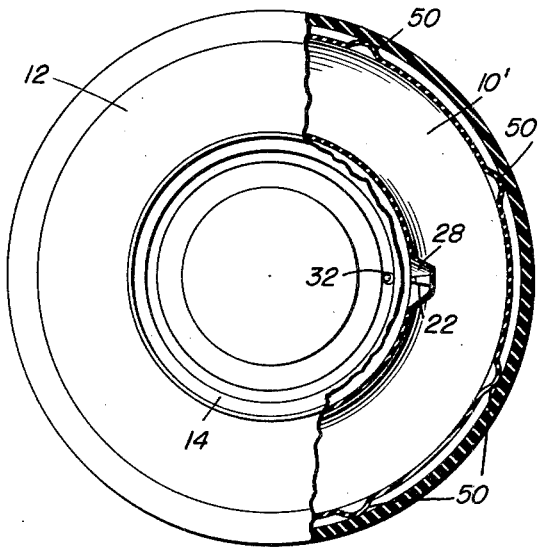
FIG. 7 is a side elevation, partially broken away, of the wheel assembly shown in FIG. 6.

In FIGS. 6 and 7 is shown a modified embodiment in which the inner tube 10' is secured to the inner surface of tire 12 at one or more circumferentially spaced spots 50. If desired, this securement may be continuous in a broad line circumferentially of the outer periphery of the tube. Preferably, the securement is made at points spaced slightly to one side of the center of the tire as this will lessen the likelihood of puncturing the tube. The securement may be accomplished by placing rubber cement on the inner wall of the tire at the spots where attachment is desired. The tire and tube are then mounted as previously described. When the tube is inflated, it will adhere to the cemented spots.

As an alternative, the tire and tube may be vulcanized together during manufacture. When the tire is inflated, the tube 10' will be compressed to provide the air space between the tube and tire everywhere except at the spots 50. The securement of the tube to the tire at points 50 greatly limits relative movement which might otherwise occur at high speeds of rotation.

Figure 8:
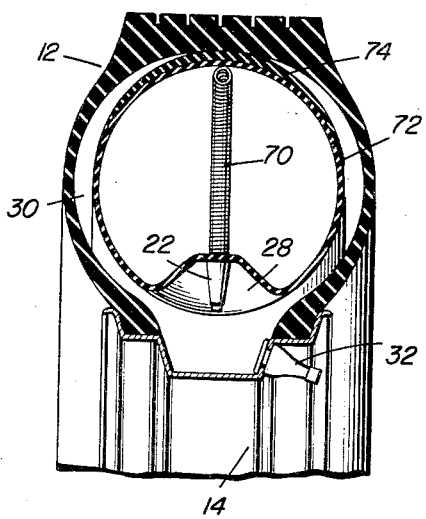
FIG. 8 is a transverse radial section similar to FIG. 6, and showing another modification.
Figure 9:
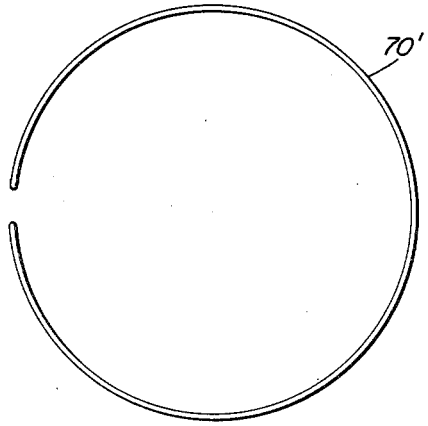
FIG. 9 is a side view of an alternative spring for disposing in a tube.

Another alternative is to provide frictional engagement between the tube and tire, as shown in FIG. 8, wherein an endless annular spring 70, such as a coil spring, normally having a diameter greater than the inner diameter of the tread portion of the tire, is disposed within the tube 72 so that when the latter is mounted within the tire 12, the spring is under compression and resiliently urges the outer circumferential periphery of the tube against the inner surface of the tire. Alternatively, the spring may comprise a split ring 70', as shown in FIG. 9, and this ring may be of a thickness to be inserted through the valve stem 22.

While the tubes herein referred to may be of the standard wholly rubber tube as shown in FIGS. 1 and 6, alternatively, they may be so-called safety tubes of the well known type having a protectively reinforced dome portion to resist friction with or pinching by the tire or puncture by a sharp object. The tube 72 is shown as a safety tube having a reinforced portion 74 and although this reinforced portion is not stretchable, the remainder of the tube is sufficiently elastic to expand and fill the tire, as shown in broken lines in FIG. 1, when the air volume in the tire escapes.

The semifloating tubes 10' and 72 illustrated in FIGS. 6 and 8 otherwise perform the same functions, and may be installed together with the tire or deflated for repair in the same manner as described for the floating tube 10 of FIG. 1. As the tube 10' is fixed relative to the tire 12, the tube stem 22 will be adjacent the rim opening 36 or stem 34 and may be fished out by a hooklike instrument for release of the valve to deflate the tube.

In the case of many conventional tubeless type tire rim valve stems, these stems may be removed from the rim by pulling them outward through the rim aperture. In some cases, that part of such stems as protrudes outside the rim must be broken, cut or sawed off. Their inside base and any part contained within the rim aperture itself will then be pushed inside and to one side of the rim aperture. A hooklike instrument may now be used to seek the stem of the inner tube and its valve core 44. The tube can then be deflated, or the stem hooked and drawn out through the rim aperture. If the comparative size of the two valves will permit, the hooklike instrument may be inserted through the larger rim valve stem after removal of its core 44 and the air of the contained inner tube released as above described or the smaller tube stem fished out through the rim valve stem for more direct application of pressure to its valve core for tube deflation.

Figure 10:
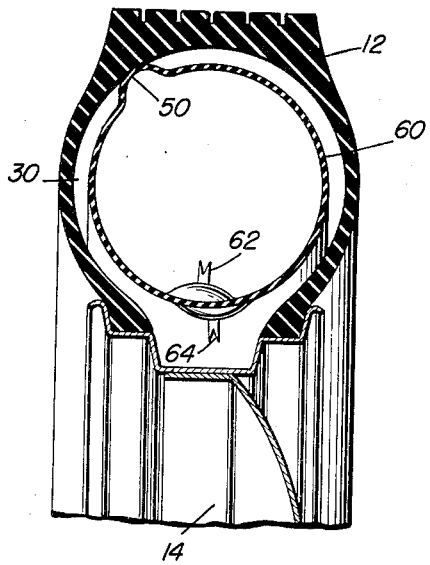
FIG. 10 is a transverse radial section similar to FIG. 6, and showing still another modification.
Figure 11:
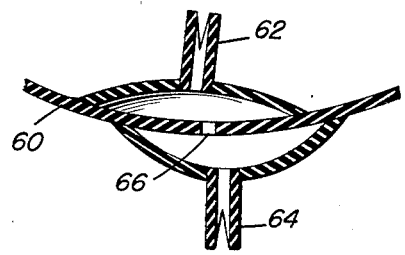
FIG. 11 is an enlarged fragmentary sectional view of the tube valve arrangement shown in FIG. 10.
Figure 12:
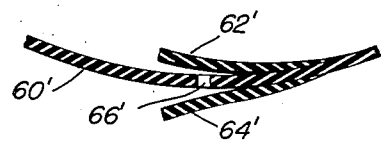
FIG. 12 is a view similar to FIG. 11, showing a modified valve structure.

In FIG. 10 is illustrated a modified inner semifloating tube 60. Tube 60 omits the metal valve stem 22 and pocket walls 26 of FIG. 2 and replaces these with a pair of flutter valves 62, 64 which, as best shown in FIG. 11, are cooperatively disposed on opposite sides of a wall of the tube 60, in operative relation to an opening 66 in the tube wall, to operate in opposite directions. The flutter valves are each soft rubber valves of conventional construction which permit movement of air in one direction only except under extreme surges of pressure. Valves 62 and 64 being opposed, prevents air from entering or leaving the tube 60 once the tube is inflated. In lieu of the flutter valves 62, 64, conventional flap or leaf valves 62', 64', as shown in FIG. 12, may be disposed on opposite sides of the tube wall 60' in covering relation to an opening 66' therein.

To inflate tube 60, the procedure described for installing the tire 12 and tube 10 of FIG. 1 is followed except that after the core 44 is removed, a hollow needle valve stem (not shown) is carefully inserted through stem 34 and through valves 64 and 62 (or past valves 62', 64') which are held in alignment therewith. The tube 60 is filled through the needle stem which is then withdrawn. The operator may at this time, to insure against leakage or effusion of air from tube 60 after the tire is inflated, apply a small amount of rubber cement through the hollow needle valve stem to the lips of the outer flutter valve 64, the inner flutter valve 62, or both, which valves are accessible through stem 34. Normally, however, the paired flutter valves will prevent such leakage. When cementing is to be used, one flutter valve is sufficient if considerable care is exercised. When the tire of FIG. 10 is inflated, the tube 60 is compressed and performs the same functions as previously described for the semifloating tube 10 of FIG. 2 except that, not having a metal valve stem, the tube will not audibly signal puncture of the tire. This type of inner tube with flutter valve is ideally suited for use as a fully free floating inner tube. While the use of helium, carbonmonoxide or other gas that is lighter than air should be considered for use in any floating inner tube, it should be of particular importance when used in this flutter valved floating tube.

Another advantage for the floating inner tube as described for use in a tubeless type tire is the decrease in inertia in the initial stages of abruptly changing the rotational rate of the tire, tube and wheel rim assembly. In abrupt acceleration of a motor vehicle, the floating tube will not increase its rate of revolution as rapidly as the tire itself. It can be said to slip for awhile. It will, in fact never rotate as fast as the tire during acceleration nor while maintaining a constant rate of revolution. It is moved in rotation only by the air stream within the tire and by occasional contact friction with the tire or rim. Since it takes a considerable amount of energy to rotate an inner tube, the adoption of this floating tube will permit faster acceleration for pneumatic tubeless type tire assemblies as described.

The reverse will be true when decelerating, especially when applying braking power to decrease the rate of revolution of this assembly. The general application of these savings will be considerable and may be of particular significance to race track vehicles where a great deal of abrupt acceleration and deceleration is of vast importance. As stated above, bringing the tire and wheel rim to an abrupt stop will not stop the tube's revolving immediately. In fact, the energy of this revolving tube can be utilized in again abruptly starting if such start is undertaken before the tube ceases to rotate. On muddy race tracks and on the highways during icy road conditions, this can be a matter of considerable importance.

Inner tube valve stem caps, which by themselves may be air sealing, were not shown in FIGS. 1, 2, 3 and 4. The use of such caps is not essential to the invention, but it should be mentioned that they are desirable and most probably would be used in order to obviate any possibility of air entering the tube during use as a floating or semifloating tube. This possibility will be found due to the sudden increase of tubeless type tire internal pressure based upon abrupt compression due to striking objects in travel and particularly in striking curbs. The spring of the valve core might not be strong enough to adequately resist this compression.

The use of a stronger valve core spring than is customary in conventional inner tubes so no valve stem air cap will be necessary and the servicing of these floating and semifloating inner tubes simplified thereby is desirable. This is of particular importance in deflating such inner tubes when it is desired to remove the tire in that without an air cap the stem can be sought out as described and deflated while in position.

Inner tube valve stem caps may be made of metal if it is desired that a signal be produced when they strike or scratch the metal of the rim. If such signal is not desired, they may be made entirely of rubber or be rubber covered or made of a material such as plastic.

It is not necessary that the tube valve stem contain a metal channel; nor is it necessary that the inner tube possess a removable valve stem core.

While floating and semifloating inner tubes have been generally shown as to be occupying the central position in the main part of the cross sections of the tires in the various figures, it is to be understood that the choice of a tube that will hug either the dome of the inner side of the tubeless type tire or the rim itself is within the invention. There are definite advantages to each of these arrangements which it is not believed necessary to here describe. Any choice of inner tube as above will make mounting the tire simple, result in a safety tube for blowout protection and provide the other advantages as previously described.

Both floating and semifloating inner tubes may vary greatly in the percentage of the tire space occupied during the operation of the tubeless type tire with its own air pressure intact. The essential is that there be sufficient air volume in such tubes that when the tire loses its air pressure, the air in the tube will cause the tube to expand and fully occupy the tire space and retain such pressure as will permit the tire to operate safely, though soft. Moreover, such tubes may be of the type having a nonexpansible reinforced dome or outer portion to resist puncture.

Although certain specific embodiments of the invention have been shown and described, it is obvious that many modifications thereof are possible. The invention, therefore, is not to be restricted except insofar as is necessitated by the prior art and by the spirit of the appended claims.

What is claimed and desired to be secured by Letters Patent is:

1. In combination, a wheel rim including an opening for a valve assembly, a tubeless type tire having beads for air sealing engagement with said wheel rim, an inner tube completely enclosed within said tire and rim to act as a safety tube and including valve means having a nipple passable through said rim opening from within the tire for direct inflation of the tube from outside the tire to expand the tire beads into sealing engagement with the wheel rim during mounting of the tire, said nipple being passed back through said rim opening and inserted completely within the tire and rim after inflation of the tube, and a valve assembly for inflation of said tire inserted into the rim opening after said tube nipple is inserted completely within the tire and rim assembly.

2. The combination according to claim 1 wherein said means for inflating the inner tube comprises diametrically opposed valves to balance said tube, each valve having a valve passage communicating with the interior of said inner tube.

3. The combination according to claim 1 wherein said means for inflating the inner tube comprises three equispaced valves to balance said tube, each valve having a valve passage communicating with the interior of said inner tube.

4. The combination according to claim 1 wherein said inner tube is fixed to the inner wall of said tire at least along portions thereof and circumferentially of the tire at a plurality of spaced connections.

5. The combination according to claim 4 wherein said connections include projections extending from the tube and disposed off the center line of the tire.

6. In combination, a tubeless type tire mounted in air sealing engagement with a wheel rim, a tire valve in said rim for admitting air to the tire and an inflated inner tube including a tube valve for inflation thereof, said tube and tube valve being completely enclosed within said tire and rim, said inner tube being at least partially formed of an elastic rubberlike material and fully expansible to fill said tire, and said inner tube being initially formed with tensioned rubber surrounding the tube valve whereby upon inflation of the inner tube, said tube valve is seated within a pocket recessed entirely within a circumscribing circle defining the periphery of the inflated inner tube.

7. The combination according to claim 6 wherein said tube valve is partially metal and audibly engages the rim when the tire is deflated.

8. The combination according to claim 7 wherein said tire is inflated at greater pressure than said inner tube compressing the tube and its valve in the chamber formed by said tire and rim, and said metal valve for the inner tube being adapted to move outwardly from said pocket and strike the rim to create an audible signal when said tire is punctured.

9. An inner tube at least partially formed of an elastic rubberlike material and including inflating valve means, said tube being initially formed with tensioned material surrounding said valve means and forming a recessed pocket within which said valve means is located, whereby upon inflation of said tube said valve means is disposed within said pocket and recessed entirely within a circumscribing circle defining the periphery of the inflated inner tube.

10. An inner tube according to claim 9 wherein said tube is provided with a plurality of valve means in balanced relation about said tube, the material around each of said valve means being prestressed and forming a pocket within which the respective valve means is recessed.

References Cited in the file of this patent

UNITED STATES PATENTS

| | | |
|---|---|---|
| 535,978 | Cooke | Mar. 19, 1895 |
| 564,763 | Pulbrook | July 28, 1896 |
| 1,496,114 | Bonner | June 3, 1924 |
| 1,764,076 | Hayes | June 17, 1930 |
| 1,955,711 | Mills | Apr. 17, 1934 |
| 2,026,161 | Collins | Dec. 31, 1935 |
| 2,169,041 | Gammeter | Aug. 8, 1939 |
| 2,592,181 | Parthemore | Apr. 8, 1952 |
| 2,608,235 | Wyman | Aug. 26, 1952 |
| 2,839,118 | Gramelspacher | June 17, 1958 |
| 2,913,035 | Lapin et al. | Nov. 17, 1959 |